United States Patent [19]

Powell

[11] 4,399,461
[45] Aug. 16, 1983

[54] ELECTRONIC IMAGE PROCESSING

[75] Inventor: Philip G. Powell, Pinner, England

[73] Assignee: Eastman Kodak Company, Rochester, N.Y.

[21] Appl. No.: 357,357

[22] Filed: Mar. 12, 1982

Related U.S. Application Data

[63] Continuation of Ser. No. 192,954, May 28, 1980.

[30] Foreign Application Priority Data

Sep. 28, 1978 [GB] United Kingdom ............... 38546/78

[51] Int. Cl.³ .......................... H04N 5/14; G06K 9/56
[52] U.S. Cl. ..................................... 358/166; 382/52; 382/53; 382/54
[58] Field of Search ................. 358/166, 167, 160, 80, 358/76, 36, 37, 283; 364/515; 340/146.3 MA, 146.3 H

[56] References Cited

U.S. PATENT DOCUMENTS

| | | | |
|---|---|---|---|
| 3,701,095 | 10/1972 | Yamaguchi | 340/146.3 MA |
| 3,814,847 | 6/1974 | Longuet | 358/166 |
| 3,950,610 | 4/1976 | Hopkins | 364/515 |
| 3,980,813 | 9/1976 | Shinkai | 358/162 |
| 3,983,576 | 9/1976 | Shanley | 358/166 |
| 3,987,243 | 10/1976 | Schwartz | 358/166 |
| 4,057,828 | 11/1977 | Monahan | 358/32 |
| 4,058,828 | 11/1977 | Ladd | 358/80 |
| 4,074,231 | 2/1978 | Yajima | 340/146.3 MA |
| 4,213,150 | 7/1980 | Robinson | 358/166 |
| 4,259,694 | 3/1981 | Liao | 358/283 |

OTHER PUBLICATIONS

Rossi, "Digital Techniques for Reducing Television Noise" SMPTE Journal, Mar. 1978, pp. 134-140.
"A Real Time Edge Processing Unit" Robinson et al., Workshop on Picture Data Description and Management, Apr. 21/22, 1977, NY; IEEE, pp. 155-164.
An Adaptive Noise Reducer for PAL and NTSC Signals, Drewery et al., The BKSTS Journal, Oct. 1978, pp. 286, 302.
An Analog-Digital Character Recognition System, Nadler, IEEE Trans. on Electronic Computers, 12/63, pp. 814-821.
Image Enhancement Processing, Winter, IBM Tech. Disc. Bull., vol. 19, No. 5, Oct. 1976, pp. 1866-1867.

Primary Examiner—Michael A. Masinick
Attorney, Agent, or Firm—David M. Woods

[57] ABSTRACT

An electronic image processing system, using image dissection by solid state devices or by scanning and sampling, applies a signal representing a succession of signal values on an array of picture elements to complementary high and low pass electronic filters to produce an output signal in which a desired image feature is enhanced and noise is suppressed. The high pass filter, e.g. FIG. 1, comprises at least one matched pair of signal weighting gradient detectors, e.g. FIGS. 3 and 5, arranged back-to-back to detect a brightness transition 10, as shown in FIGS. 4 and 6, and having their outputs cored independently. Each pair will be sensitive to gradients in a particular direction in the array, e.g. horizontal, vertical or diagonal. The system is applicable to two-dimensional spatial arrays, three dimensional spatial arrays, and also to the temporal dimension, e.g. succession of moving pictures.

12 Claims, 21 Drawing Figures

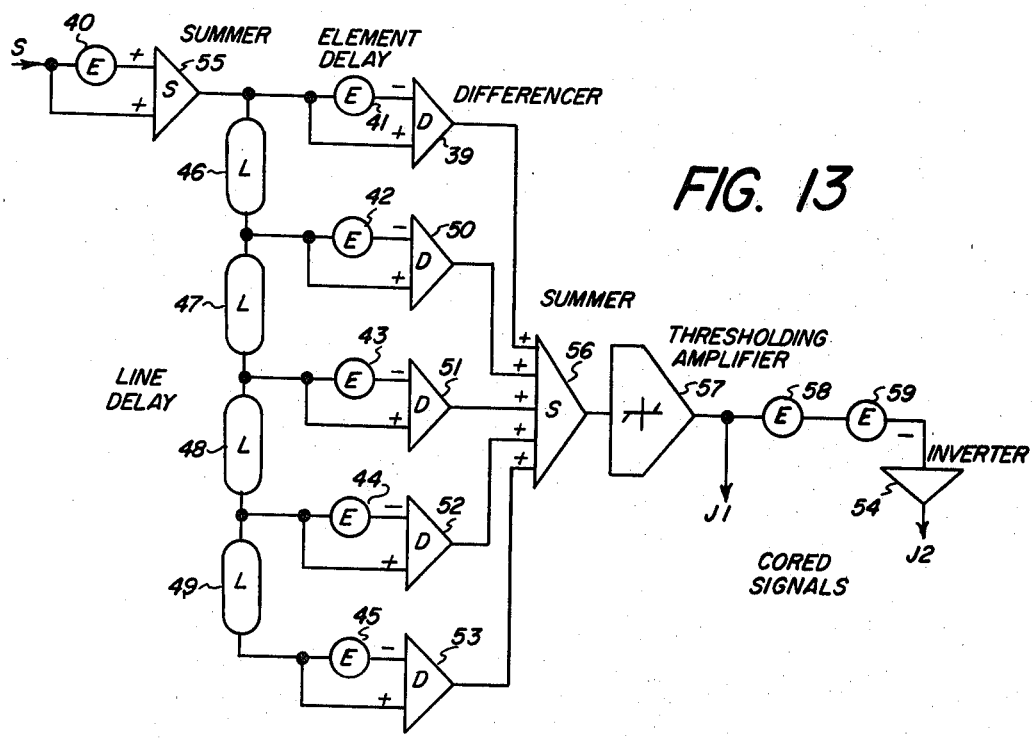

ELECTRONIC IMAGE PROCESSING

This is a continuation of application Ser. No. 192,954, filed May 28, 1980.

This invention relates to electronic image processing systems using image dissection, for example, by solid state devices or by scanning and sampling.

Electronic image processing systems are known in which signals from a predetermined array of picture elements, or pels, are summed and averaged using electronic circuits so as to generate a signal or signals displaying selected components of the spatial fluctuations in image brightness. Appropriate weighting or multiplying factors are applied to the signals from the individual pels constituting the array in order to produce the desired response. One such known circuit generates a signal displaying mainly the large scale spatial fluctuations of the image brightness, the circuit acting as a low pass spatial filter. Another known circuit acts as a high pass spatial filter and generates a signal displaying mainly the small scale fluctuations that characterize the fine detail of the image. In practice, a set of filters having a high pass characteristic are utilised to generate signals corresponding to respective selected components of the spatial fluctuations in image brightness.

These circuits can be used at the same time on the signals from one array of pels, and if the combined weighting on each of the pels due to the low pass circuit and the set of circuits having the high pass characteristic is zero on all but one pel of the array, then these filters are complementary. Under this condition, addition of the output signals from the filters regenerates the input signal unchanged, except for any change in gain.

The two-dimensional spatial frequency response of such complementary filters may be illustrated diagrammatically as performing a partitioning of the spatial frequency plane into two areas, a central area surrounding and including the zero frequency origin and representing the pass band of the low pass filter, and the area outside this central region and up to the band limit of the system representing the pass band of the high pass filter. The use of such complementary low pass and high pass spatial filters at the same time enables the high frequency components of the final scanned image to be selectively modified by amplification or attentuation for the purposes of image enhancement or noise suppression.

Electronic circuits performing the function of spatial filters as described have also been employed to detect the occurrence of predetermined image features. Each particular set of pel weightings, sometimes called a mask, is chosen to match a desired image feature. Thus, a one pel, or point, feature detector on a 3×3 pel array can be formed by the set of pel weightings:

| −1 | −1 | −1 |
| −1 | 8  | −1 |
| −1 | −1 | −1 |

This set of weightings, known in the prior art, can also be considered to form a high pass spatial filter. The complementary low pass filter would be formed by the set of weightings.

| 1 | 1 | 1 |
| 1 | 1 | 1 |
| 1 | 1 | 1 | so that the two sets sum to form

| 0 | 0 | 0 |
| 0 | 9 | 0 |
| 0 | 0 | 0 |

In this case all weightings should be divided by 9 to give unity overall gain.

Similarly, particular vertical and horizontal line detectors on a 3×3 pel array, known in the prior art, are formed respectively by the sets of weightings

| −1 | 2 | −1 |     | −1 | −1 | −1 |
| −1 | 2 | −1 | and | 2  | 2  | 2  |
| −1 | 2 | −1 |     | −1 | −1 | −1 | which can also be considered to form high pass spatial filters. The use of spatial filtering techniques for feature detection thus involves summing the signals from an array of pels after weighting the signals in accordance with the characteristics of the feature required. If the absolute value of such a weighted sum exceeds a predetermined threshold, then the particular image feature associated with that set of weightings is assumed to have been detected.

Among the most important constituents of images are edges or brightness transitions. In order to detect such transitions, particular vertical and horizontal edge detectors on a 3×3 pel array, known in the prior art, are formed respectively by the sets of weightings:

| −1 | 0 | 1 |     | −1 | −1 | −1 |
| −1 | 0 | 1 | and | 0  | 0  | 0  |
| −1 | 0 | 1 |     | 1  | 1  | 1  | which also can be considered to form horizontal and vertical gradient detectors, respectively. It will be noticed that both of these sets include pairs of next-adjacent (as distinct from adjacent) linear strings of pel weightings, that all the weightings in a string are of the same sign, that the weightings on the next-adjacent strings are of opposite sign, and that the weightings sum to zero. Summing the signal values from the corresponding pels after weighting in this way will, therefore, produce a signal characteristic of the first-difference on next-adjacent pels taken in a horizontal or a vertical direction, respectively.

It is also possible to have a gradient detector with a pair of linear strings of pel weightings satisfying the foregoing requirements but with the two strings being adjacent to one another. In this case, summing the signal values after weighting in this way will produce a signal characteristic of the first difference on adjacent pels.

Following such detection at a particular image location, the image processing procedure applied at that location may be modified. For example, where the point feature detector referred to above is employed together with the complementary low pass filter, the high pass output signal from the detector might be added to the low pass signal to form a regenerated signal when the detector output is greater in absolute magnitude than the predetermined threshold. This known technique has been described as signal coring with reference to its application in noise suppression systems.

Signal coring is most directly applied in image processing applications where the cored signal is provided by a set of high pass filters that is complementary to the low pass filter with which the set is associated. The regenerated signal thus formed from the combination of the cored high pass signal and the low pass signal substantially relates to but one pel of the array. If these filters are not complementary, some bands of frequencies may be omitted from the regenerated signal, or some bands of frequencies may be duplicated in the regenerated signal causing an undesirable increase in signal level within these duplicated bands. As a result, undesirable artifacts are developed in image locations corresponding to adjacent pels, e.g., forming unwanted lines adjacent the detected feature.

Appreciating that edges are of most interest, both line detectors and edge detectors are responsive to the brightness transitions represented by edges. While either detector may therefore appear useful, each has its inherent limitations. A line detector provides inherently poorer signal-to-noise performance than an edge detector. However, the edge detector requires an arrangement of pel weightings that prevents substantial complementarity to the low pass filter with which it is associated.

While available edge and line detectors both possess undesirable attributes, they are nonetheless the conventional means for processing edge constituents of an image. The invention approaches this problem from the novel viewpoint that a high pass filter can be reconstituted by combining one or more pairs of matched gradient (or edge) feature detectors. This premise provides a solution to edge processing difficulties by utilizing the desirable attributes of each detector, namely, that a gradient (or edge) detector can provide a considerably better signal-to-noise performance for the detection of image edges or brightness transitions than can the high pass filter (e.g., a line detector) described above while the high pass filter can provide considerably better complementarity to a low pass filter than can the gradient (or edge) detector described above.

Thus in accordance with the present invention an electronic image processing system includes a high-pass electronic spatial filter comprising a pair of matched gradient detectors arranged back-to-back to detect a brightness transition such as an edge with their outputs being cored independently before being combined to comprise the output of the reconstituted high-pass filter.

This enables brightness transitions, such as image edges perpendicular to the opposed directions of sensitivity of the pair of gradient detectors, to be detected with improved signal-to-noise performance without adding undesirable artifacts to the reconstituted high pass signal.

The matched pair of gradient detectors are arranged back-to-back so that they are sensitive to oppositely directed gradients, and have one of the component strings of pel weightings in common. They therefore respond to a scanned edge which is parallel to the linear strings of pel weightings making up the pair of gradient detectors. The pair of gradient detectors may be disposed to sense an edge which appears to extend horizontally, or vertically or diagonally in the image.

The high-pass filter of the invention may comprise more than one pair of matched gradient detectors. One pair may detect an edge extending in one direction, e.g. horizontally, while another pair, or pairs, may detect an edge, or edges, extending in a second, or further direction. Each gradient detector output will be cored independently.

Although there are clear advantages to be obtained by the use of a plurality of pairs of gradient detectors sensitive to different spatial directions, it should be appreciated that use may be made of more than one pair of gradient detectors which are sensitive in the same direction. This may be advantageous where the two or more pairs have different pass bands together making up the desired high-pass characteristic. If the pel strings for one such pair are adjacent then they will form a high-pass filter, while if they are next-adjacent or more widely spaced they will form a bandpass filter.

The principle of the invention still applies even if each of the two strings of a gradient detector includes only a single pel weighting.

Image enhancement in accordance with the invention may also be made responsive to temporal variations in pel signals in cases where temporal sampling is effected as in frame sequential moving picture systems such as for example in television. Application of the principle can then ensure that inter-frame averaging can be used in uniform areas while avoiding, or reducing, image smear in areas of image motion or change.

An electronic image processing system in accordance with the invention may include a network which cores first difference weighted signals from adjacent or from next adjacent pels of an array of at least three pels and then generates second difference signals from the cored first difference signals to provide an appropriate image feature enhancing signal.

The principles of the invention set out in the preceding paragraphs may be used in conjunction with signals from 3×3, 5×5 or larger rectangular arrays and may also be modified for use with known arrays of hexagonal or other shape.

Although it is preferred that the high pass filter, formed by the sum of the gradient-detecting filters, and the low pass filter, are complementary in that the combined weightings of these filters on corresponding pels sum to zero on all pels except the central pel, it may be found that useful improvements in signal to noise ratio are still obtainable where relatively small residual weightings remain on some pels, particularly on the outer pels, of the array after the weightings have been combined. The filters may then be said to be substantially complementary.

The invention will now be described in more detail with reference to the accompanying drawings in which.

Figure 3:
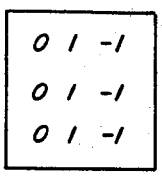
FIGS. 3 and 5 show individually known gradient, or edge-feature, detectors.
Figure 4:
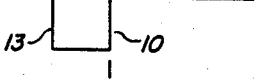
Figure 5:
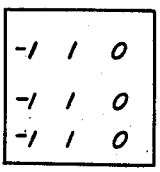
Figure 6:
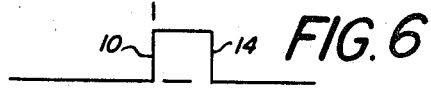
Figure 7:
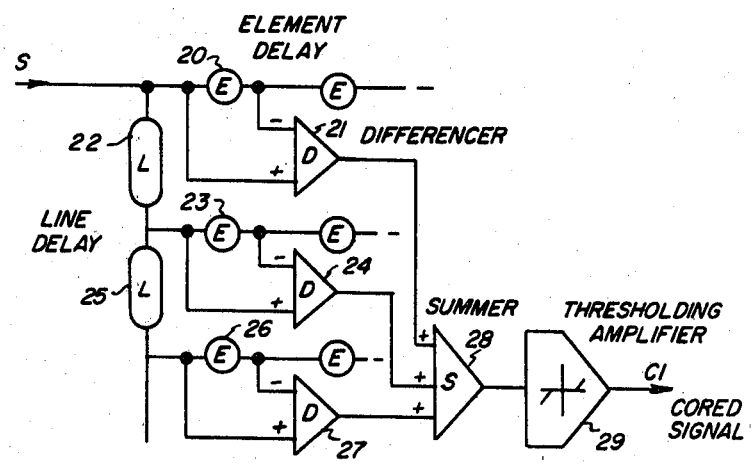
Figure 8:
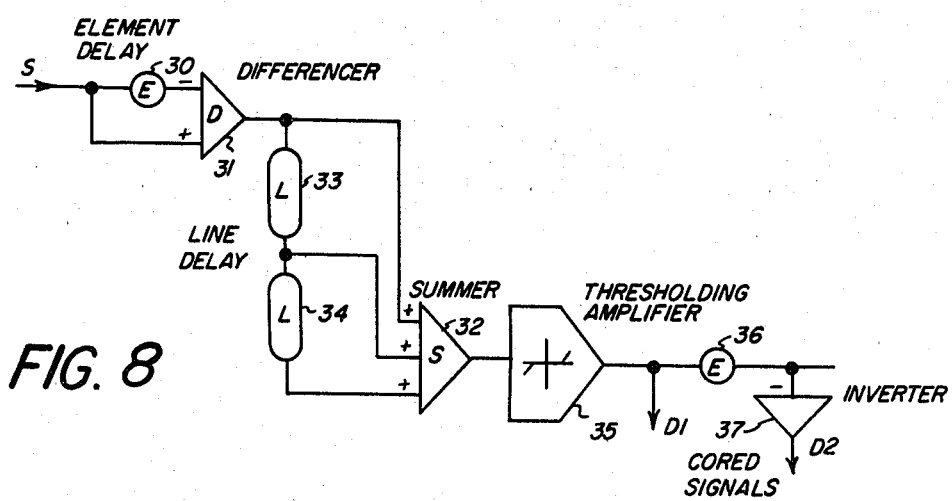

FIGS. 4 and 6 respectively show the output waveform caused by scanning the detectors of FIGS. 3 and 5 over the edge image 10;

FIG. 7 is a network constituting one of a complementary pair of horizontal gradient detectors which are spaced one pel apart in a first embodiment of the invention;

FIG. 8 shows an alternative network to FIG. 7, a single element delay unit being used in the gradient detector to derive difference signals between adjacent pels, and also shows means for deriving the output of the complementary horizontal gradient detector;

FIG. 9 shows a high pass spatial filter, and

Figures 14, 15, 16, 17:
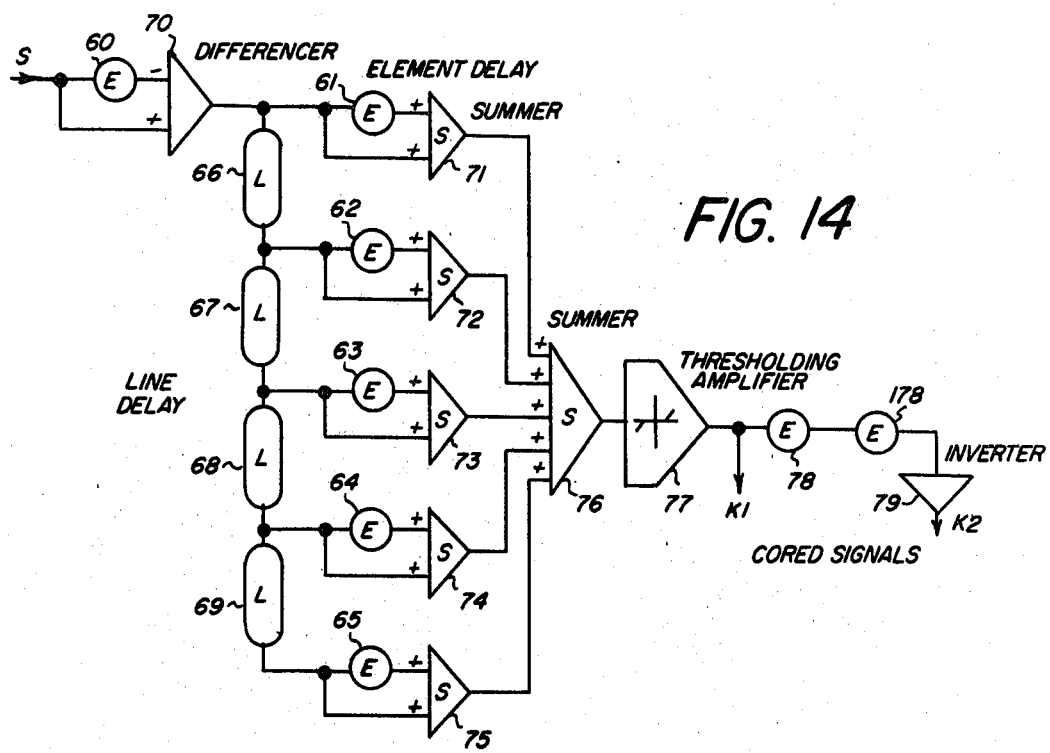
Figure 18:
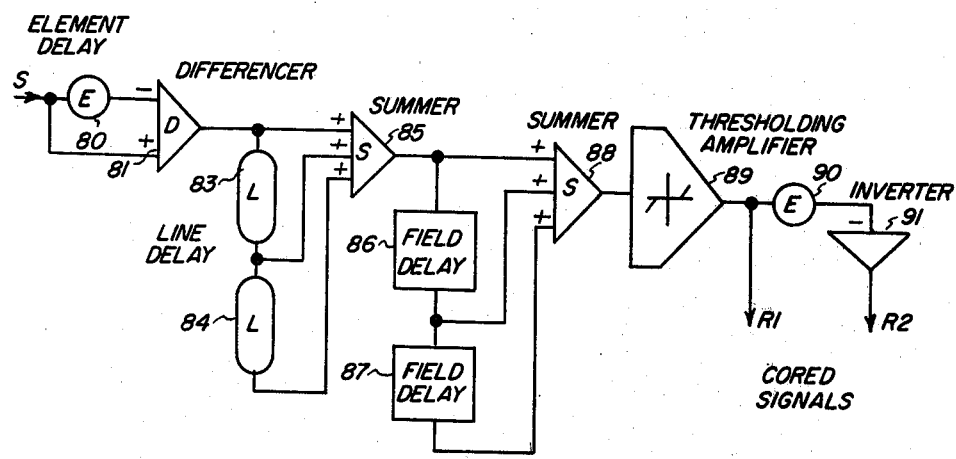
Figure 19:
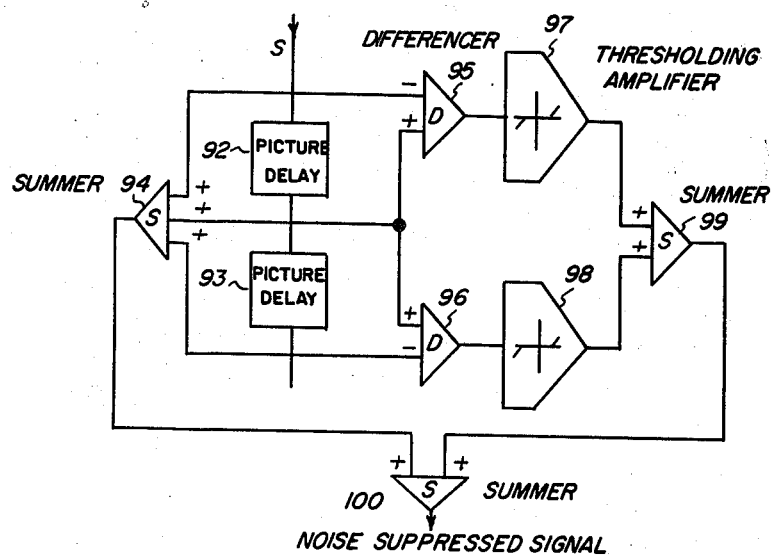
Figure 20:
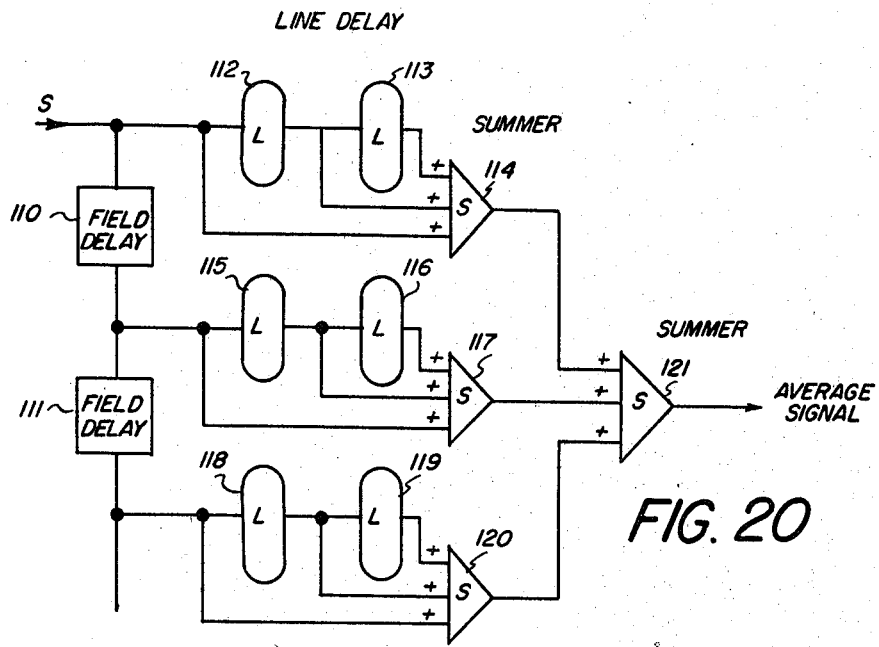
Figure 21:
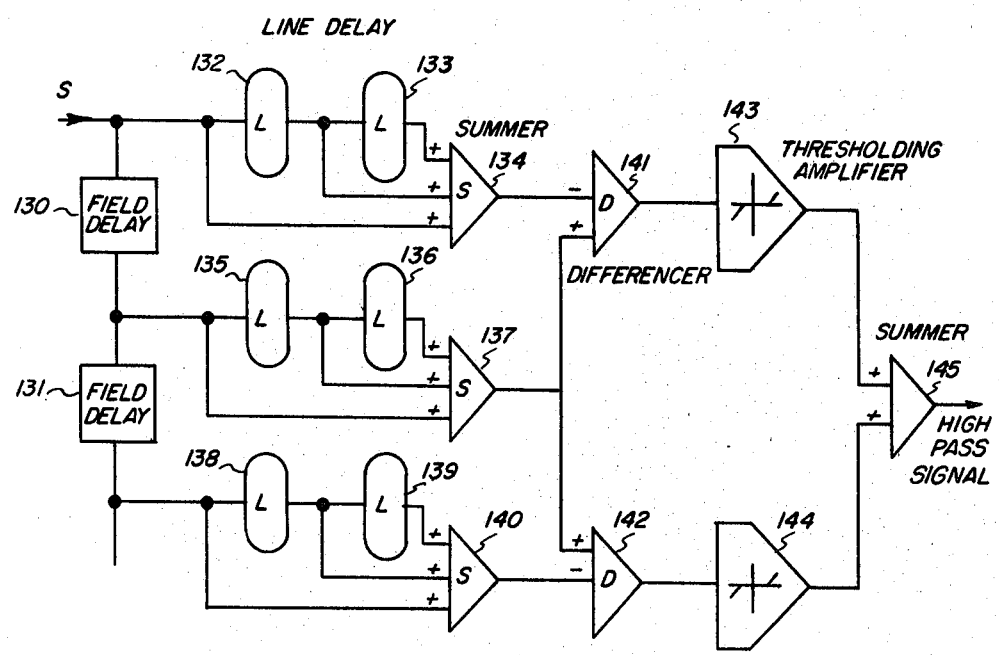

FIG. 10 shows a matched complementary pair, E and F, of horizontal gradient detectors derived therefrom;

FIG. 11 shows a band pass spatial filter, and FIG. 12 shows a matched pair, G and H, of horizontal gradient detectors derived therefrom;

FIG. 13 shows a third network in accordance with the invention, using the principle of the network of FIG. 7, but applied to next-adjacent pels, for providing spatial filtration using the pair of gradient detectors G and H of FIG. 12;

FIG. 14 shows a fourth network in accordance with the invention, using the principle of the network of FIG. 8 but applied to next-adjacent pels, for providing spatial filtration using the pair of gradient detectors G and H of FIG. 12;

FIG. 15 shows a band pass diagonal line detector for a 5×5 pel array, and FIG. 16 shows a matched pair, L and M, of diagonal gradient detectors derived therefrom;

FIG. 17 shows a complementary pair, N and P, of diagonal gradient detectors for a 3×3 pel array;

FIG. 18 shows a fifth network in accordance with the invention and applying its principles to an image in three spatial dimensions;

FIG. 19 shows a sixth network in which temporal sampling of a sequence of pictures is effected;

FIG. 20 shows a seventh network arranged to derive a tempero-spatial average signal for noise suppression; and FIG. 21 shows an eighth network arranged to derive a tempero-spatial gradient signal for modifying the output of FIG. 20 when horizontal image motion takes place between successive pictures.

Figure 1:
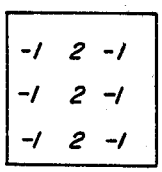
FIG. 1 shows a known high pass spatial filter or line detector.
Figure 2:
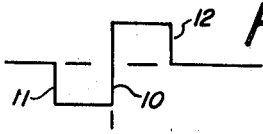
FIG. 2 shows the output waveform caused by scanning the filter of FIG. 1 over an edge image 10.

In considering the invention in more detail attention is invited to FIG. 1 of the accompanying drawings where a high pass filter or line detector for a 3×3 pel array is shown. An this filter is scanned over an edge image 10 there is generated an output, shown in FIG. 2, consisting of a negative pulse 11 immediately followed by a positive pulse 12.

However the high pass filter or line detector of FIG. 1 may be separated into two back-to-back gradient, or edge-feature, detectors spaced one pel apart as shown respectively in FIGS. 3 and 5. Their respective individual outputs on being scanned over the same edge image 10 are the spaced negative pulse 13 and positive pulse 14, seen respectively in FIGS. 4 and 6.

It will be noted that the negative pulse 13 is in the same spatial location in relation to the edge 10 as the negative pulse 11, and similarly with the positive pulse 14 and 12. The outputs of the two gradient detectors of FIGS. 3 and 5 therefore do not overlap for the same edge, and they can be thresholded or cored independently. As the noise level of their outputs is lower by a factor of $$\frac{1}{\sqrt{3}},$$

for a white gaussian noise input, than that of the line-feature detector of FIG. 1, the threshold or coring level used in the subsequent signal processing can either be reduced, leading to better signal transmission, or, with the same threshold level, better noise rejection can be achieved. Thus there are advantages in substituting the pair of matched gradient detecting spatial filters of FIGS. 3 and 5, spaced one pel apart, for the high pass filter of FIG. 1.

A single horizontal gradient detector constituting one of this pair of filters is shown in the network of FIG. 7. Here the incoming video signal S from an image scanning system is applied to a 1 element delay 20, to a differencer 21, and to a 1 line delay 22. The 1 element delayed signal is also applied to the differencer 21 and the result is applied, together with the corresponding results for the two pels of the next two lines (by way of 1 element delay 23, differencer 24, and by way of 1 line delay 25, 1 element delay 26, and differencer 27) to the summer 28. The sum, representing the output of the gradient detector of FIG. 5 for example, is applied to the amplifier 29 which performs the thresholding operation to produce the cored signal C1. A second similar network, not shown, may be used to produce a cored output C2, not shown, for the other horizontal gradient detector of the pair, or, more economically this output may be produced by delaying signal C1 with a one element delay, not shown, and inverting it with an inverter, not shown in this particular Figure. The two cored signals C1 and C2 are then summed to provide an output which will be suitable for enhancing the image of the vertical edge 10.

As an alternative, the first difference signals may be obtained prior to the use of the line delay units. FIG. 8 shows another horizontal gradient detector in which the first difference signals between adjacent pels are obtained prior to the line delay units. Here the input signal S is applied only to the 1 element delay 30 and the differencer 31. The 1 element delayed output is also applied to the differencer 31, and the resultant difference between one pel and the adjacent pel is applied to the summer 32 and also to the 1 line delay 33 and thence to the 1 line delay 34, the outputs of these line delays also being applied to the summer 32. Amplifier 35 received the output of summer 32 to produce thresholded output signal D1. As before, another network, not shown, may be used to supply the cored output D2 of the other horizontal gradient detector, or this may be derived more economically as shown by delaying signal D1 with a one element delay 36 and inverting it in inverter 37. The two cored signals D1 and D2 are then summed to provide an output which will be suitable for enhancing the image of the vertical edge 10.

For a vertical gradient detector, the networks shown could be used after interchanging the line and element delay units. Again, the cored outputs of the pair of gradient detectors are summed to provide an output which will be suitable for enhancing the image of a horizontal edge.

The above examples use pel weightings of +1 and −1 but the weightings used need not be either equal or unity. Thus from the high pass filter of FIG. 9 there may be formed a matched pair of gradient detectors E and F of FIG. 10. The necessary signals for horizontal gradient detection may be obtained using the networks of FIG. 7 or FIG. 8, with the addition of the appropriate weighting factors shown in FIG. 10. The cored outputs of the two gradient detectors E and F are summed to provide an output which is enhanced where a vertical line or edge is scanned.

It should be noted that the pattern of weightings of the high pass filter of FIG. 9, in addition to forming the matched pair of gradient detectors E and F, can be rotated through 90° to form an additional filter. In this form it can be used to generate a second matched pair of gradient detectors sensitive to gradients at right angles to those sensed by the pair E and F shown in FIG. 10. Use of this second pair additionally will provide enhancement of horizontal image edges in addition to the enhancement of vertical image edges provided by the first pair.

The combined output from these two pairs of gradient detectors make up the output of the high pass filter, and is added, possibly after amplification or attenuation, to the output of the complementary low pass filter

| 1 | 1 | 1 |
|---|---|---|
| 1 | 1 | 1 |
| 1 | 1 | 1 | to form the enhanced video signal.

The examples so far described have used adjacent strings of pel weightings but this is not a necessary restriction. In FIG. 11 is shown a band pass filter, this time for a 5×5 pel array, which uses next-adjacent strings. This can be replaced by the pair of gradient detectors G and H of FIG. 12, which also have next-adjacent strings of pel weightings with one string in common and whose outputs, after coring, together give an advantage in signal to noise ratio. The required signals can be generated by networks of the types shown in FIGS. 7 and 8 if each of the single element delay units there shown is replaced by a pair of such units. Alternatively the required signals J1 and J2 from one such pair of gradient detectors may be generated by a network similar to that shown in FIG. 13. Here single delay units are used but the outputs of adjacent pairs of pels are summed. This arrangement uses the principle of FIG. 7 but derives both output signals as shown. FIG. 13 shows element delay units 40, 41, 42, 43, 44, 45, 58 and 59; line delay units 46, 47, 48 and 49; differencers 39, 50, 51, 52 and 53; summers 55 and 56; thresholding amplifier 57; inverter 54; the incoming signal is S and the output of one detector is J1 while that of the other detector of the complementary pair is J2.

Because they comprise a band pass filter the pair of filters G and H do not form a complete set with respect to a complementary low pass filter, in the sense that the pair of filters E and F does with the rotated version referred to above with reference to FIG. 9. Other filters must be used in addition to make up such a complete set with a high pass characteristic, although in practice it may be desirable to omit some of the component filters.

Yet another alternative network is shown in FIG. 14, corresponding to FIG. 8. Here a differencer 70 is connected to the first element delay unit 60 and summers 71, 72, 73, 74 and 75 replace the differencers 39, 50, 51, 52 and 53 of FIG. 13. In other respects these arrangements are the same, the other element delay units being identified at 61, 62, 63, 64, 65, 78 and 178, the line delay units at 66, 67, 68 and 69, the thresholding amplifier 77 receiving the output of summer 76, and an inverter 79. The pair of cored outputs of the high pass filter are K1 and K2.

The described gradient detectors have been horizontal, or, in some cases, vertical detectors. The same principle can be applied to diagonal gradient detectors. In FIG. 15 is shown a band pass diagonal line detector for a 5×5 pel array. This can be replaced by the pair of filters L and M of FIG. 16.

FIG. 17 shows a pair of diagonal gradient detecting filters N and P for a 3×3 array. The high pass filter from which they were derived is not shown. It will be appreciated that the pairs of diagonal filters of FIGS. 16 and 17 require networks similar in principle to FIGS. 7, 8, 13 or 14 but with the delay units re-arranged to select the signals from the appropriate picture elements.

The above embodiments of at least one pair of gradient detectors replacing a single high pass filter will normally be used in conjunction with the complementary or substantially complementary, low pass filter.

In some instances the inclusion of such particular signals in the final sum, or the processing of signals, can be made dependent on the presence or absence of other predetermined signals. Whether or not such an adaptive system is advantageous will depend upon the characteristics desired.

The invention is applicable to analogue and to digital systems. In a digital system it is desirable but not essential that the weightings are limited to powers of 2.

The foregoing examples are concerned with two-dimensional arrays of pels but it should be understood that the present invention is not limited to such arrays.

One extension of the invention is to the multi-dimensional scanning of a stationary object. In this case at least three high pass spatial frequency filters may be formed, each comprising at least one pair of back-to-back gradient detectors as referred to above, where the signal gradients are now directed in multi-space and are derived from pairs of weighted sums over two-dimensional sheets or planes of pels, rather than one-dimensional strings of pels, and the complementary low-pass filter comprises a weighted sum over all pels within a corresponding 3-dimensional region. In any particular application the choice of weighting patterns within the principles described above will depend on the characteristics of the images to be enhanced.

An example of a network suitable for 3-dimensional application is shown in FIG. 18. To assist in appreciating the relationship of this network to those described above it should be noted that in the network of FIG. 8, the first signal differences in one dimension, generated by element delay 30 and difference 31 are summed over a second dimension by line delay units 33 and 34 and summer 32 before being cored. In the network of FIG. 18 the first signal differences in one dimension are generated from the incoming signal S by an element delay unit 80 and differencer 81 and summed over a second dimension by line delay units 83 and 84 and summer 85. In this application a third spatial dimension is being scanned in sequential fields, and the output of summer 85 is summed over this third spatial dimension by field delay units 86 and 87 and summer 88. The summer output is applied to amplifier 89 which effects a coring or thresholding operation to provide an output R1 of one gradient detector network. An element delay 90 and inverter 91 provide the output R2 for the other gradient detector network of the pair. R1 and R2 are summed to provide an image enhancing signal. The two directions of summing, by summers 85 and 88, define a summing plane that is normal to the direction in which the first differences are generated. Other similar circuits could be used to generate difference signals directed in other directions, with summing over other planes normal to these other directions.

The stage at which the first differencing operation is performed may be changed so that FIG. 18 could be based on the principle of FIG. 7 rather than FIG. 8.

In the three-dimensional application described above with reference to FIG. 18, the summing of weighted signal values is effected over two dimensions which together define a summing plane that is normal to the direction in which the first signal differences are generated. This latter direction has been referred to as a third spatial direction in the three-dimensional application. In fact it is not necessary for this direction to be spatial, and it may be temporal. Any signal differences in this temporal direction represent differences between successive views of a changing image or moving object which is being scanned sequentially. These views could be successive frames from a succession of moving pictures, and the temporal differences may be obtained by use of a temporal processing network including gradient detectors and temporal averager including at least two picture storage elements so that signal values on any pel can be compared over at least three successive pictures.

Referring now to FIG. 19, the example of a temporal processing network shown applies a video signal S in turn to two picture delay units 92 and 93. A temporal average summer 94 derives the average low pass signal value for a pel over the succession of three pictures, and a pair of differencers 95 and 96 function as gradient detectors to generate the respective first difference weighted signals across the first and the second picture delay units 92 and 93. These first difference signals are independently thresholded or cored by amplifiers 97 and 98, and the resultant signals applied to a summer 99 to derive the grain suppressed second difference temporal gradient signal. This temporal gradient signal is small or zero for image areas with little or no temporal change, and increases with the rate of image change. Combining this signal in summer 100 with the signal from the temporal averager 94 causes the noise suppression produced by the averaging process to be reduced in areas of image change with the greatest reduction being obtained in areas of maximum change. It is to be noted that, looking in a temporal direction, the pair of differencers 95 and 96 form back-to-back gradient detectors providing signals that constitute a high pass signal when combined in the adder 99.

The network of FIG. 19 can be used alone as indicated in a single temporal dimension. Additionally it can be used in conjunction with networks performing summing over one or more spatial dimensions, which would be appropriate when the image change arises from image motion. In this case the network of FIG. 19 would be preceded by a network performing summing over a linear array of elements arranged normally to the specified direction of motion. The output from summer 94 would then be a tempero-spatial average while the output from 99 would be a tempero-spatial image-enhancing signal suitable for the reduction of image smear due to image motion in the specified direction. For maximum freedom from image smearing the spatial gradients sensed should extend in horizontal, vertical and diagonal directions, and appropriate pairs of gradient detectors in the form of spatial filters should be used.

Thus a network which generates a tempero-spatial difference signal output characteristic of the gradient in only one spatial direction using line or element delay units, will probably not provide freedom from image smear due to movement in other directions. Nevertheless, such a network may find useful applications, and since horizontal movement in motion pictures is more common than vertical movement, a tempero-spatial network now to be described, sensitive to horizontal gradients may be particularly useful.

Alternatively the same result could be achieved with other networks, for example those of FIGS. 20 and 21 where spatial sampling is effected horizontally, in accordance with a filter weighting pattern not shown, together with temporal sampling. FIG. 20 shows a network for deriving the tempero-spatial average signal from video signal S. This video signal is applied in succession to field storage elements 110 and 111, and in succession to pairs of line delay units 112 and 113, with their associated summer 114; units 115 and 116 with their associated summer 117; and units 118 and 119 with their associated summer 120. The outputs from the three summers are combined by summer 121.

FIG. 21 shows a network for deriving the tempero-spatial gradient detector high pass output for combining with the low pass output of FIG. 20. In FIG. 21 the video signal S is applied in succession to field storage elements 130 and 131, and to a pair of line delay units 132 and 133 with their associated summer 134. A second pair of line delay units 135 and 136 and their associated summer 137, and a third pair of line delay units 138 and 139 and their associated summer 140 receive the video signal delayed by one and two picture intervals respectively. These pairs of line delay units and their associated summer are coupled in pairs to differencers 141 and 142 which generate the first difference tempero-spatial signals which are then thresholded or cored by amplifiers 143 and 144. These signals are added by summer 145 whose outputs constitutes the high pass output for addition to the output of summer 121 of FIG. 20.

The networks of FIGS. 20 and 21 could be simplified by carrying out the multi-line summing in a single unit, having a pair of line-delay units and a summer, before applying the signal to the field delay units. The first differencers are then connected directly to the field delay units.

Multi-dimensional scanning has been described above with reference either to spatial coordinates in three dimensions or a temporal coordinate plus spatial coordinates in two dimensions. However these embodiments are merely exemplary of applications for the invention and are not intended as a restriction. For example, sets of matched gradient detectors may be scanned over an object in four dimensions, including three spatial dimensions and a fourth temporal dimension as well, to provide an image enhancement signal suitable for enhancing the brightness transitions in each of the four dimensions.

With all of the arrangements described above it will normally be the practice to apply the video signal to a low pass filter and to the pair of pairs of gradient-detectors constituting the complementary high pass filter. The combined output signal from the pair or pairs of gradient-detectors provides an image-enhancing signal to be added back to the output of the low pass filter in such manner as to provide an apparently improved image with greater discrimination between wanted image features and unwanted noise.

I claim:
1. An electronic filter responsive to a plurality of brightness signals for generating a filtered image signal representative of an enhanced image, said brightness signals corresponding to a predetermined array of elements of an image, said filter comprising:
   means responsive to the brightness signals for generating a first gradient signal;

means responsive to the brightness signals for generating a second gradient signal which is inverted and delayed by a time corresponding to at least one image element with respect to said first gradient signal;

means for modifying at least one of said first and second gradient signals; and means for combining said first and second gradient signals after such modification to generate the filtered image signal.

2. A filter responsive to sampled brightness data for generating a filtered image signal representative of a feature-enhanced image, said sampled brightness data being derived from elemental portions of a feature-containing image, said filter comprising:

means responsive to said sampled brightness data for generating a first gradient signal representative of brightness transitions in the image;

means responsive to said sampled brightness data for generating a second gradient signal matched to said first gradient signal but inverted and delayed by a time corresponding to at least one elemental portion of the image with respect to said first gradient signal;

means for modifying said first and second gradient signals to emphasize said feature; and means connected to said modifying means for generating the filtered image signal from a composite of said first and second modified gradient signals.

3. A filter responsive to sampled brightness data for generating a filtered image signal representative of a feature-enhanced image, said sampled brightness being derived from elemental portions of an image containing at least one image feature and a noise component, said filter comprising:

first and second means responsive to said sampled brightness data for generating respective first and second symmetrical gradient signals which are mutually inverted and time offset by the elapsed sampling time of at least one elemental portion of the image;

means for modifying said first and second gradient signals to de-emphasize said noise component; and means for combining said first and second modified gradient signals to generate the filtered image signal.

4. An electronic filter defined by a predetermined matrix of filter weighting coefficients so selected as to generate a filtered image signal representative of an enhanced image, said filter being responsive to a plurality of brightness signals corresponding to similarly arrayed elements of an image, said filter comprising:

first and second gradient detecting filters defined by first and second paired submatrices of filter weighting coefficients so selected as (1) to form the predetermined matrix of filter weighting coefficients by matrix addition of said respective submatrices, and (2) to generate first and second paired gradient signals responsive to said brightness signals;

means for applying a threshold to said first and second gradient signals to generate respectively modified gradient signals; and means responsive to a composite of said first and second modified gradient signals for generating the filtered image signal.

5. An electronic filter responsive to a plurality of brightness signals for generating a filtered image signal representative of a feature-enhanced image, said brightness signals corresponding to a predetermined array of elements of a feature-containing image, said filter comprising:

means for generating a pair of signals responsive to the differences between brightness signals representing respective paired elements of the image, said respective element pairs being similarly oriented with respect to a selected image feature and said differences being executed in opposite directions with respect to said selected image feature;

means for thresholding said pair of signals; and means for combining said pair of thresholded signals to generate the filtered image signal.

6. An electronic filter responsive to a plurality of brightness signals for generating a filtered image signal representative of a feature-enhanced image, said brightness signals corresponding to a predetermined array of elements of an image, said filter comprising:

first and second paired gradient detecting filters responsive to the brightness signals for generating first and second gradient signals, said paired filters including means for implementing a corresponding pair of filter coefficient matrices each having at least one coefficient centrally arrayed with respect to the other matrix to spatially correspond to a selected feature and at least one further side coefficient arrayed on each side of the central coefficient, said at least one coefficient on one side being zero and on the other side being a selected value of opposite polarity to the central coefficient, the side coefficients of said pair of filter coefficient matrices being in reversed order with respect to each other;

means for coring said first and second gradient signals; and means responsive to the combination of said first and second cored gradient signals for generating the filtered image signal.

7. A spatial filter responsive to sampled brightness data for generating a filtered image signal representative of a feature-enhanced image, said sampled brightness data corresponding to a predetermined two dimensional array of elemental portions of a feature-containing image, said filter comprising:

means responsive to said two dimensional array of sampled brightness data for generating a first gradient signal representative of brightness transitions predominantly oriented relative a single dimension of the image;

means responsive to said two dimensional array of sampled brightness data for generating a second gradient signal matched to said first gradient signal but inverted and delayed with respect to said first gradient signal by a time corresponding to at least one elemental portion relative said single dimension of the image;

means for applying a threshold to said first and second gradient signals to generate respectively modified gradient signals; and means for combining said first and second modified gradient signals to generate the filtered image signal.

8. A filter responsive to sampled brightness data for generating a filtered image signal representative of a feature-enhanced image, said sampled brightness data derived from elemental portions of a feature-containing image, said filter comprising:

first and second paired filter means responsive to the brightness data for generating first and second signals representative of brightness transitions corresponding to oriented features in the image, said paired filter means including means for implementing a corresponding pair of filter coefficient matrices each including at least one string of filter weights of the form [−a a o], [o a −a] or [−a o o o], [o o a o −a] in which a is any rational number and said at least one string of filter weights forms a linear array selectively-oriented relative to said oriented brightness transitions;

means for coring said first and second signals; and means responsive to the combination of said first and second cored signals for generating the filtered image signal.

9. An electronic filter responsive to a plurality of brightness signals for generating a filtered moving picture signal representative of a succession of enhanced moving picture images, said brightness signals corresponding to a predetermined array of similarly positioned elements of a succession of moving picture images, said filter comprising:

means responsive to the brightness signals for generating a first gradient signal representative of brightness transitions between like-positioned elements in the succession of images;

means responsive to the brightness signals for generating a second gradient signal matched to said first gradient signal but inverted and delayed with respect to said first gradient signal by an interval corresponding to at least one moving picture image;

means for modifying said first and second gradient signals; and means for combining said first and second modified gradient signals to generate the filtered moving picture signal.

10. Electronic image processing apparatus responsive to a plurality of brightness signals for generating a filtered signal representative of an enhanced image, said brightness signals being derived from elemental portions of an image, said image processing apparatus comprising:

means responsive to the brightness signals for generating a low pass signal representative of large scale brightness fluctuations in the image;

means responsive to the brightness signals for generating first and second symmetrical gradient signals representative of small scale brightness transitions in the image, said gradient signals being mutually inverted and time offset by at least one elemental portion of the image;

means for modifying said first and second gradient signals to emphasize said small scale brightness transitions; and means for combining said low pass signal and said first and second modified gradient signals to generate the filtered signal representative of an enhanced image.

11. Electronic image processing apparatus responsive to sampled brightness data for generating a filtered image signal representative of an enhanced image, said sampled brightness data being derived from elemental portions of an image, said electronic image processing apparatus comprising:

a low pass filter responsive to the brightness data for generating a low pass signal representative of large scale brightness fluctuations in the image;

high pass filter means for generating a high pass signal representative of small scale brightness fluctuations in the image, said high pass filter means including paired gradient detecting means responsive to said brightness data for generating respective first and second symmetrical gradient signals that are mutually inverted and time offset by at least one elemental portion of the image, means for coring said first and second gradient signals, and means for combining said first and second cored gradient signals to generate said high pass signal; and means for combining said low pass and high pass signals to generate the filtered image signal representative of the enhanced image.

12. Electronic image processing apparatus responsive to sampled brightness data for generating a filtered image signal representative of a feature-enhanced image, said sampled brightness data being derived from an array of elemental portions of a feature-containing image, said electronic image processing apparatus comprising:

a sampled data low pass filter responsive to the brightness data for generating a low pass image signal representative of the average brightness of the array of elemental portions;

at least one sampled data bandpass filter means for generating a bandpass signal representative of intermediate scale features in the image, said bandpass filter means including paired intermediate scale gradient detecting means responsive to said brightness data derived from said array for generating symmetrical first and second intermediate scale gradient signals that are mutually inverted and time offset by at least one elemental portion of the image, means for coring said first and second gradient signals, and means for combining said first and second cored gradient signals to generate said bandpass signal;

sampled data high pass filter means for generating a high pass signal representative of small scale features in the image, said high pass filter means including paired small scale gradient detecting means responsive to said brightness data derived from said array for generating symmetrical third and fourth small scale gradient signals that are mutually inverted and time offset by at least one elemental portion of the image, means for coring said third and fourth gradient signals, and means for combining said third and fourth cored gradient signals to generate said high pass signal; and means for combining said low pass, bandpass and high pass signals to generate the filtered image signal representative of a feature-enhanced image.

* * * * *

UNITED STATES PATENT OFFICE
CERTIFICATE OF CORRECTION

PATENT NO. : 4,399,461

DATED : August 16, 1983

INVENTOR(S) : Philip G. Powell

It is certified that error appears in the above-identified patent and that said Letters Patent are hereby corrected as shown below:

Column 4, lines 62-63, delete "complementary" and substitute therefor --matched--'

Column 5, line 2, delete "complementary" and substitute therefor --matched--;

Column 5, line 23, delete "complementary" and substitute therefor --matched--; and Column 7, line 43, delete "complementary" and substitute therefor -- matched--.

Column 5, line 4, delete "complementary";

Column 5, line 53, "pulse" should read -- pulses --;

Column 10, line 53, the first occurrence of "of" should read -- or --.

Signed and Sealed this

Thirty-first Day of January 1984

[SEAL]

Attest:

GERALD J. MOSSINGHOFF

Attesting Officer

Commissioner of Patents and Trademarks